United States Patent [19]

Rasmussen et al.

[11] Patent Number: 5,222,136
[45] Date of Patent: Jun. 22, 1993

[54] ENCRYPTED COMMUNICATION SYSTEM

[75] Inventors: Harry R. Rasmussen, Tacoma; Jack D. LaBounty, Bellevue; Michael J. Rosenow, Issaquah; John D. Hoskinson, Pacific; Joseph G. Maurin, Puyallup, all of Wash.

[73] Assignee: Crest Industries, Inc., Pacific, Wash.

[21] Appl. No.: 918,352

[22] Filed: Jul. 23, 1992

[51] Int. Cl.⁵ .......................... H04L 9/00; H04L 9/06; H04L 9/08
[52] U.S. Cl. ......................................... 380/9; 380/18; 380/21; 380/29; 380/43; 380/49
[58] Field of Search .................... 380/9, 18, 21, 30, 43, 380/46, 49, 50, 52, 29

[56] References Cited

U.S. PATENT DOCUMENTS

| | | | |
|---|---|---|---|
| 4,218,582 | 8/1980 | Hellmann et al. | 380/30 |
| 4,677,670 | 6/1987 | Henderson, Jr. | 380/23 |
| 4,771,462 | 9/1988 | Hannan et al. | 380/44 |
| 4,809,327 | 2/1989 | Shima | 380/44 |
| 4,876,716 | 10/1989 | Okamoto | 380/21 |
| 4,888,802 | 12/1989 | Cooney | 380/49 |
| 4,910,776 | 3/1990 | Dyke | 380/25 |
| 4,985,919 | 1/1991 | Naruse et al. | 380/18 |
| 5,001,750 | 3/1991 | Kato et al. | 380/18 |
| 5,003,597 | 3/1991 | Merkle | 380/37 |
| 5,073,935 | 12/1991 | Pastor | 380/30 |
| 5,081,678 | 1/1992 | Kaufman et al. | 380/21 |
| 5,124,117 | 6/1992 | Tatebayashi et al. | 380/21 |

OTHER PUBLICATIONS

A. Konheim, *Cryptography: a Primer*, (John Wiley & Sons, Inc.; 1981; pp. 288-293 & 331-347).

Schneier, B., "Untangling Public-Key Cryptography," *Dr. Dobb's Journal*, May 1992, pp. 16-28.

*Primary Examiner*—Bernarr E. Gregory
*Attorney, Agent, or Firm*—Christensen, O'Connor, Johnson & Kindness

[57] ABSTRACT

A system for exchanging encrypted data between selected devices at stations comprising a network. The system includes an encrypted communications device (ECOM) (12) that selectively encrypts data from one of a plurality of different devices. With the ECOM, a user selectively encrypts voice transmissions from a telephone, facsimile transmissions produced by a facsimile machine, or data transmissions, either from a personal computer (PC) or from a modem connected to a PC for transmission over non-secure telephone lines (18) to another such device connected to an ECOM at the other location. The receiving ECOM initiates secure communications by encrypting a portion of a data encryption key (DEK) that is transmitted back to the first ECOM, which decrypts it and then generates a second portion of the DEK for transmission back to the receiving ECOM. These two portions are then exclusively ORed (XORed) together by each ECOM to determine the DEK for use in encrypting and decrypting data during the current session. Each ECOM includes a public network of key exchange keys (KEKs) that are used for encrypting the selected portions of the DEK used during the session. In addition, a private network of ECOMs includes a private table of KEKs, so that only those ECOMs comprising the private network can establish secure communications with each other using the private table of KEKs.

20 Claims, 7 Drawing Sheets

ENCRYPTED COMMUNICATION SYSTEM

FIELD OF THE INVENTION

The present invention is a system for encrypting and decrypting communications between two stations and, more specifically, is a system for selecting a data stream from one of a plurality of different data sources for secure transmission in an encrypted format produced using an encryption key.

BACKGROUND OF THE INVENTION

Systems for encrypting and decrypting data for transmission over non-secure radio or telephone links have been highly refined to meet the needs of the military and private industry. An encryption algorithm that is virtually unbreakable in any reasonable time frame, by even the most powerful of high-speed computers, has been developed and published in the U.S. by the National Bureau of Standards. This algorithm is sanctioned for use by industry in this country as an acceptable method for protecting computerized data that must be transmitted between two parties over communication links that may not be secure. In fact, integrated circuits designed specifically for encryption and decryption of data in accordance with this Data Encryption Algorithm (DEA) are readily available from several vendors, such as Western Digital TM. This algorithm, like most encryption schemes, uses an encryption key to encrypt data. Successful use of the DEA or any other encryption/decryption algorithm using an encryption key requires that the station receiving the encrypted transmission have access to the same encryption key used to encrypt the transmission in order to decrypt it. To avoid breach of the secure communications, no unauthorized party should have access to the encryption key that is being used.

Prior art encryption/decryption systems using the DEA or similar methods to encrypt data have typically been designed to encrypt a single source of data. However, much of the communications between corporate and government offices at different locations is conducted with several different communication devices, including facsimile machines, computers, and telephones, each of which represent a potential security risk if a third party taps into the communication link connecting these devices. The conventional approach to protecting communications between such devices would use a separate built-in or add-on security system for each device. Facsimile transmissions and computer communications might be protected with separate encryption systems, such as an encryption card that plugs into the back plane or bus of two computers that must be linked for secure data exchange. However, in the case of telephones, other approaches for providing secure communications have normally been adopted. For example, secure transmission of telephone conversations is sometimes implemented using analog or digital filters and/or frequency shifting techniques to scramble or distort the analog voice signal in a defined manner. The receiving device then unscrambles the signal by applying a corresponding reverse processing of the scrambled analog signal. Unfortunately, the circuitry required for scrambling and unscrambling voice signals is relatively expensive. Even more expensive is the use of separate security systems to protect each type of communications device in an office.

What is needed is a single system to encrypt communications between telephones, facsimile machines, and computers. Each of these types of communication devices produce very different signals, even though these signals are almost always transmitted over a telephone line. A universal encryption system should thus be able to selectively encrypt a variety of communication signals, including facsimile, digital, and analog voice signals. The cost and space saving benefits provided by using a single encryption system for all communications devices at a common location is readily evident. Each location or office then represents a single station that can carry on secure communications using a variety of different devices with any other such station.

In certain prior art schemes for maintaining a secure network, each station is identified by a code that is known only by the other members of the network that may want to communicate with that station. This station identification code must be maintained in secret to prevent unauthorized parties from tapping the communication links between stations and intercepting encrypted signals. A better arrangement would allow publication of such identification codes to enable stations on a public network to communicate with any other station that is using the same encryption gear, but secure communications between parties without verification of the identification codes would be precluded. Interception and decryption of communications intended for another station by a third party using the same encryption/decryption apparatus must be avoided. However, secure systems rarely provide any method to ensure that encrypted communications can only occur with an intended recipient—except by using secret identification codes. Once a secret identification code is compromised, the security of the network is lost. No technique is disclosed in the prior art for verifying that the identification codes of two stations initiating secure communications are correct, if those identification codes are publicly known.

Each station in an encrypted communications network typically engages in secure communications with a defined group of other stations on a regular basis. For that reason, it would be desirable to store a list of the identification codes for each of the stations comprising such a group in an electronic memory so that a station identification code can be readily selected from the list for use by the encryption system. The encryption system should also allow the stored identification codes to be readily entered and changed as needed, and the identification codes should be available to the public. Since encryption of voice communications is preferably accomplished by interfacing an encryption system to a conventional telephone, the encrypted communications system should enable the entry of identification codes for frequently called stations to be stored in the encryption network using a conventional telephone touch-tone keypad.

SUMMARY OF THE INVENTION

In accordance with the present invention, an encrypted communications system is claimed that includes a sealed (or "potted") encryption/decryption circuit. The encryption/decryption circuit is encapsulated in a material opaque to radio waves and light waves and comprises processor means for selectively encrypting and decrypting input data in accordance with predefined instructions using a session key, part of which is automatically randomly determined by the processor means. In addition, the circuit includes non-volatile memory means for storing the predefined instructions. A line modem is coupled to the sealed encryption/decryption circuit and to a transmission link over which encrypted messages are transmitted and received by the line modem. Similarly, a device modem is coupled to the encryption/decryption circuit and is selectively couplable to an external device, selected, for example, from a group that includes a facsimile machine, a telephone, and a data source. The device modem digitizes an input analog signal received from the external device and converts a digital signal from the encryption/decryption circuit to an output analog signal that is supplied to the external device. The encryption/decryption circuit thus encrypts the digital input signal using the session key, transfers an encrypted form of the signal to the line modem, and decrypts an encrypted signal received from the line modem. The decrypted signal is transferred as a digital signal to the device modem for conversion to an output analog signal. Control means are coupled to the encryption/decryption circuit to determine the mode in which it operates. Also coupled to the encryption/decryption circuit is a display on which the mode of operation is indicated.

The control means preferably comprise a device selector switch for selecting the external device that provides the input analog signal to the device modem and receives the output analog signal from the device modem. The control means also include a mode switch that selects operation of the encryption/decryption circuit in either a non-secure mode in which signals transmitted and received over the transmission link are not encrypted, or a secure mode in which the signals are encrypted with the session key. A network switch on the control means selects between a plurality of sets of key exchange keys (KEKs) stored in the non-volatile memory means so that a specific KEK used by the processor means can be chosen from the selected set for initiating secure communications by encrypting part of the session key for transmittal to another location. At least one set of KEKs is associated with a private network, so that secure communications are limited to another station comprising the private network if a user selectively uses the KEKs associated with the private network.

The encrypted communications system further includes a data port that is coupled to the encryption/decryption circuit. The data port is also couplable to an external digital device to receive digital input data for encryption and to transfer digital output data that have been decrypted by the encryption/decryption circuit, thus bypassing the device modem.

The processor means selectively generate the set of KEKs associated with the private network, encrypts that set, and transfers the encrypted KEKs through the data port to an external digital device for storage.

The set of KEKs associated with the private network are alternatively input in an encrypted form through the data port from an external digital device. The encryption/decryption circuit decrypts the encrypted form of the KEKs and the resulting set is stored by the non-volatile memory means (encrypted under a key unique to each such unit). The non-volatile memory means also store an identification code that uniquely identifies a specific encryption/decryption station. Secure communications are immediately halted if directed to an encryption/decryption station having an identification code different than that stored in the non-volatile memory means.

Means are provided for storing a plurality of identification codes of encryption/decryption stations at other locations to facilitate initiating secure communications with them. The display selectively shows an identification code of another encryption/decryption station with which secure communications are to be initiated, which have been selected from among those identification codes that are stored, and the control means use the selected identification code to initiate the secure communications.

The device modem digitizes a voice analog signal for encryption by the encryption/decryption circuit and converts a digitized signal comprising a voice transmission decrypted by the encryption/decryption circuit, producing a corresponding analog voice signal.

Preferably, the processor means preclude acceptance and use of operating parameters entered on the control means, unless a security code is input by a user.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
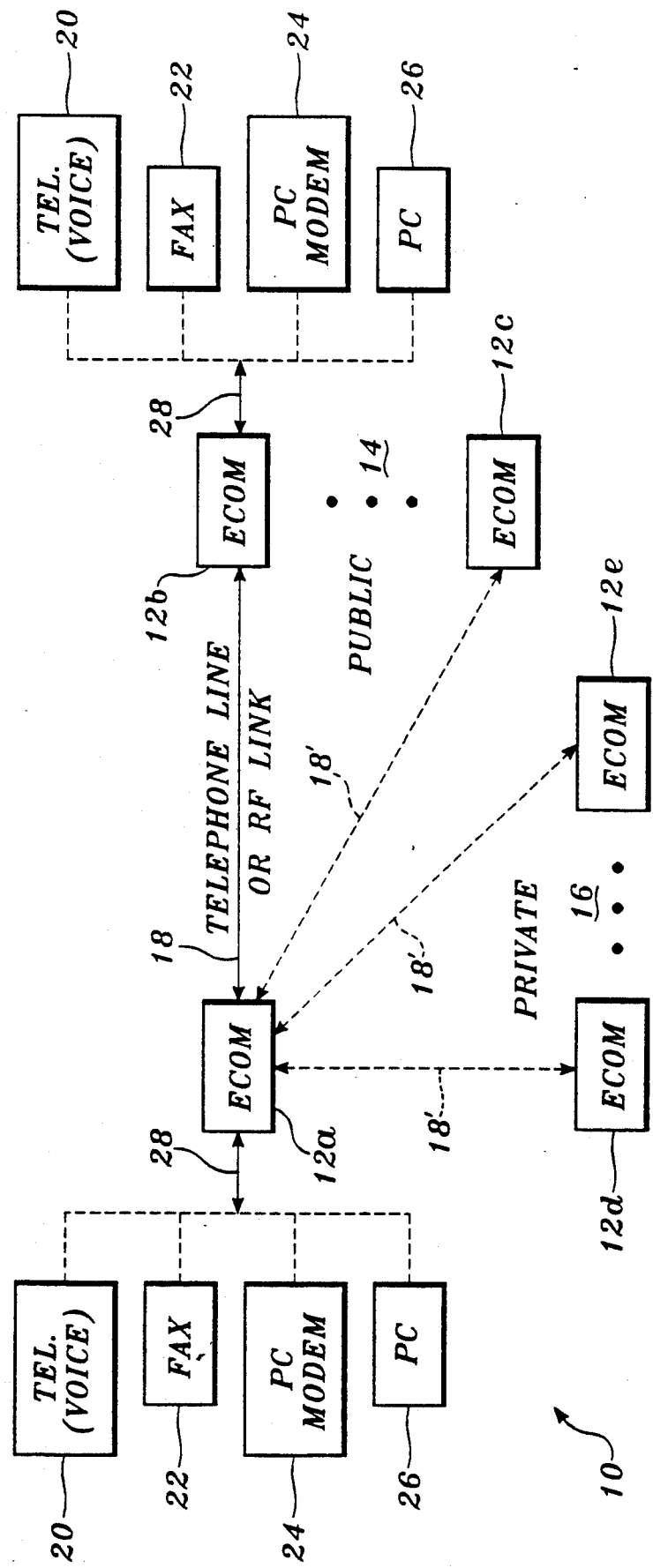
FIG. 1 is a schematic block diagram of a secure communications system that uses the present invention.

Referring now to FIG. 1, a secure communication system is generally indicated at reference numeral 10. Secure communication system 10 includes a plurality of encrypted communication devices (ECOMs) 12, any two of which can be linked together to exchange encrypted data for decryption at the receiving ECOM. For example, as shown in the figure, an ECOM 12a is linked by a non-secure telephone line 18 to another ECOM 12b. It is also contemplated that a radio frequency (RF) link could be used for such communications instead of a telephone line. ECOM 12b and a plurality of additional ECOMs of which only an ECOM 12c is shown, comprise a public network 14 with which ECOM 12a can communicate. In addition, a plurality of ECOMs 12d-12e comprise a private network 16. Thus, ECOM 12a can be selectively connected to communicate encrypted data over nonsecure telephone lines 18' with any of the ECOMs comprising the public network, such as ECOM 12c, or any of the ECOMs comprising the private network, such as ECOMs 12d or 12e. The distinction between ECOMs comprising public network 14 and those comprising private network 16 is described below in greater detail, but simply relates to KEK tables that are stored in electronic memory in the ECOM. All ECOMs 12 include the same public table of KEKs, but only those ECOMs 12d-12e comprising private network 16 include the same private table of KEKs. This private table is generated on one of the ECOMs in the private network and distributed in an encrypted form, for example, on a floppy disk or by encrypted communications using the public table of KEKs, for input and storage in the other ECOMs of the private network.

Each ECOM 12 can selectively encrypt and decrypt data from a telephone 20, a facsimile machine 22, a PC modem 24, or directly from the serial port (RS-232) of a PC 26. One or more of these sources are bi-directionally coupled to each ECOM 12 by lines 28. Assuming that ECOM 12b receives encrypted data from ECOM 12a over unsecured telephone line 18, it decrypts the data and conveys the data over lines 28 to the corresponding device, i.e., telephone 20, facsimile machine 22, PC modem 24, or PC 26. It is not necessary that all of these types of data sources be connected to any one ECOM, but the same or a compatible type of data source for the data encrypted by one ECOM must be available at the receiving ECOM, so that the decrypted data can be presented to a user.

Figure 2:
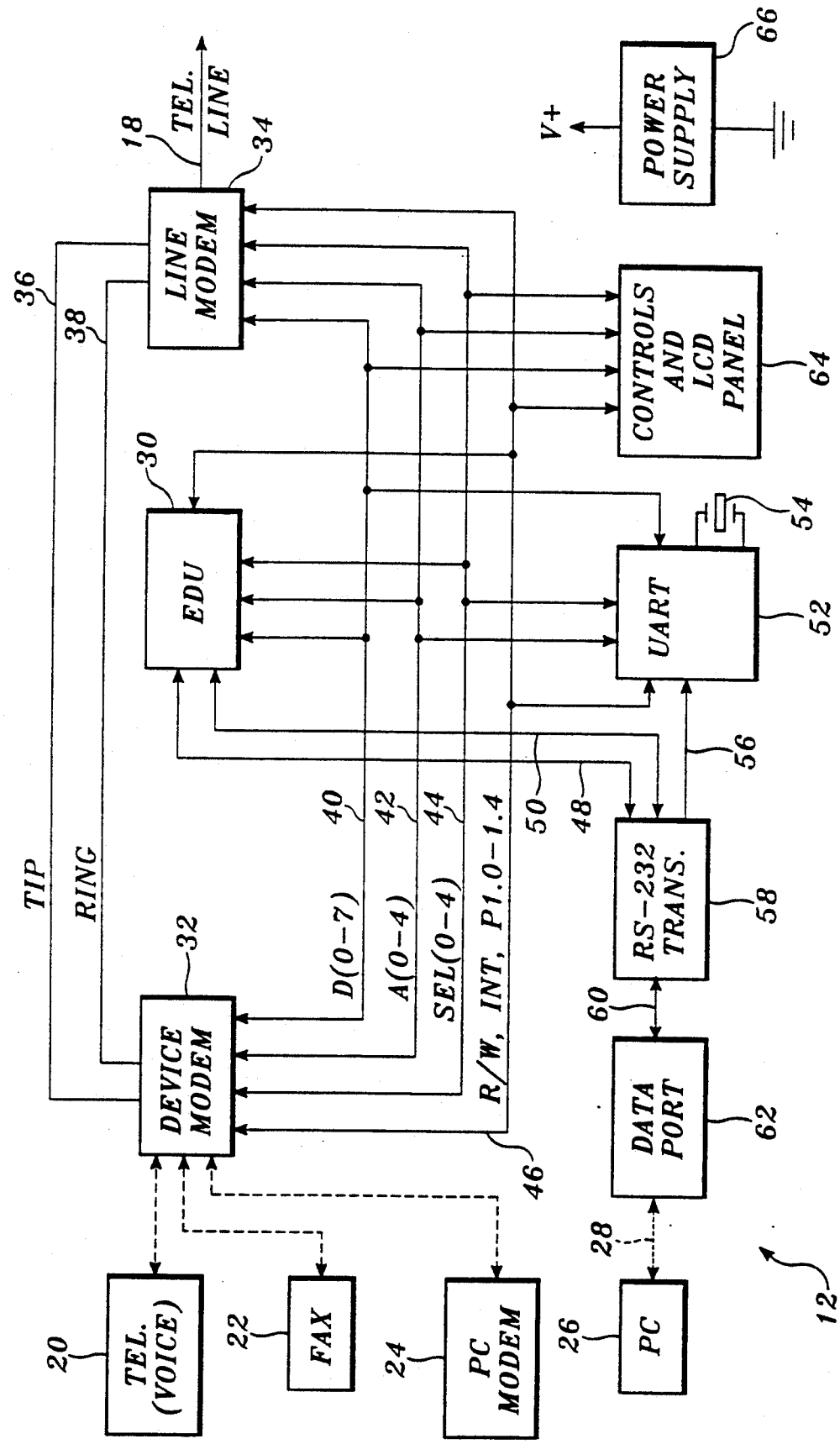
FIG. 2 is a block diagram of a secure communications station that includes an encrypted communications device (ECOM) in accordance with the present invention.

Referring now to FIG. 2, details of an exemplary ECOM 12 are illustrated in a block diagram to show how the various data sources are connected to the ECOM and to illustrate the major components comprising the ECOM. The heart of ECOM 12 is an encryption/decryption unit (EDU) 30. EDU 30 not only controls operation of ECOM 12, but carries out all of the encryption/decryption of data transmitted and received by the ECOM. Any one or all of telephone 20, facsimile machine 22, or PC modem 24 are connected through lines 28 to a device modem 32 in ECOM 12. For example, telephone 20, which can comprise virtually any conventional telephone, is connected through lines 28 to ECOM 12 via a standard RJ 11 port (not separately shown). If telephone 20 is the only device connected to ECOM 12, it should include a touch-tone key pad, since programming of ECOM 12 uses the touch-tone keypad on a telephone or facsimile machine, or the keyboard of PC 26. The entry of data into ECOM 12 with a conventional touch-tone keypad or PC keyboard is described in greater detail below.

In the preferred embodiment of ECOM 12, facsimile machine 22 comprises any schedule III type facsimile machine that operates at up to 9600 baud; the facsimile machine is connected to ECOM 12 through a standard RJ 11 port (not shown).

Data output from PC modem 24 can be supplied to ECOM 12 at data rates up to 2400 Baud asynchronous through an RJ 11 port on device modem 32. Higher data rates may be achieved, depending on the characteristics of the device modem that is used. Alternatively, PC 26 can provide binary data through lines 28 to a data port 62 on ECOM 12 is serial format at rates up to 38.4 KiloBaud. Device modem 32 accepts only a single data source at a time for encryption, and supplies data that has been decrypted to only a single data source. However, it should be apparent that it selectively connects with the telephone, facsimile machine, or PC modem in device modem 32. Likewise, if any of the preceding three devices are selected to transmit or receive data through device modem 32, data port 62 will not be used to accept data for transmission or to provide data to PC 26.

Device modem 32 is interconnected to EDU 30 and to a line modem 34 in ECOM 12 by a data bus 40 that carries 8 bits of data, and by an address bus 42 that carries address bits 0-4. In addition, select lines 44 interconnect device modem 32 to EDU 30 and line modem 34. Select lines 44 carry five select bits that are used to define the operating state of ECOM 12. In addition, miscellaneous lines 46 interconnect device modem 32, EDU 30, and line modem 34 and are used to convey read/write signals, interrupt signals, and signals for ports 1.0-1.4 in EDU 30. Data bus 40, address lines 42, select lines 44, and miscellaneous lines 46 are also connected to a "controls and LCD panel" 64, and to a universal asynchronous receive/transmit (UART) circuit 52. UART circuit 52 is provided with a piezoelectric crystal 54 to determine its time base and serve as a timing reference.

EDU 30 is connected to an RS-232 transmitter 58 by lines 48 and 50, and to UART 52 by lines 56. Serial data are bi-directionally conveyed between data port 62 and RS-232 transmitter 58 over lines 60. These data are either supplied from PC 26 to EDU 30 for encryption, or represent data that are received in an encrypted form over non-secure telephone line 18 and decrypted by EDU 30. After being decrypted, the data are supplied through RS-232 transmitter 58 to data port 62 for input to PC 26.

A power supply 66 supplies power at appropriate voltages to operate each of the components comprising ECOM 12 and is generally conventional in design.

In the preferred embodiment, device modem 32 comprises a Rockwell modem integrated circuit with digital signal processor, type RC9623DP or type RC96V23DP. Preferably, the same integrated circuit is used for line modem 34. Because device modem 32 includes an analog-to-digital (A-D) converter, analog voice signals from telephone 20 are readily digitized and supplied in digital format to EDU 30, which encrypts the digital voice data for transmission over non-secure telephone line 18 through line modem 34. Device modem 32 and line modem 34 are interconnected by tip and ring lines 36 and 38. Although not separately shown, both the device modem and line modem include impedance matching transformers and other components for carrying out their respective interface functions. For example, device modem 32 includes a relay for selectively connecting to the input device selected by a user, i.e., telephone 20, facsimile 22, or PC modem 24. In addition, line modem 34 includes a small loud speaker and associated speaker amplifier (neither are separately shown) used to make the signaling tones (busy signal, ringing signal, off-hook) carried on non-secure telephone line 18.

In the event that an RF line is used in lieu of the preferred telephone line to interconnect ECOMs 12, an appropriate interface to line modem 34 and a receiver and transmitter connected thereto (not shown) respectively receive and transmit the encoded data signals transferred between ECOMs 12.

Figure 3:
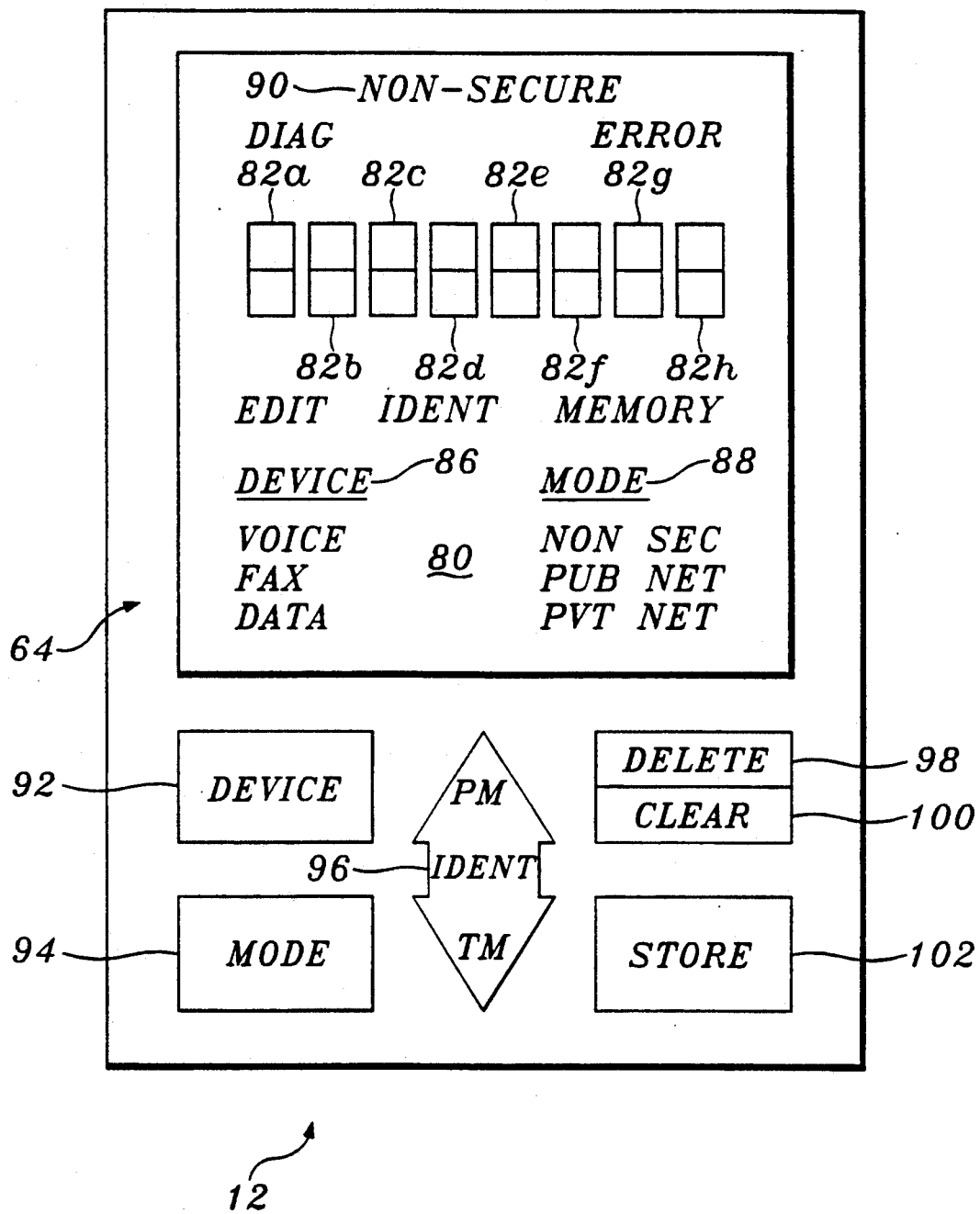
FIG. 3 is a plan view of a liquid crystal display and control panel for the ECOM.

In FIG. 3, details of controls and LCD panel 64 that is disposed on the top surface of ECOM 12 are shown. A liquid crystal display (LCD) screen 80 includes eight digits 82a through 82h, each capable of indicating required alphanumeric characters. At the top of LCD screen 80 is provided a region 90 that can alternatively be energized to indicate that ECOM 12 is operating in a "SECURE" or a "NON-SECURE" mode, depending upon whether the letters "NON-" are displayed or not. Below digits 82 is disposed a region 84, which when energized, indicates that the ECOM is operating in an "EDIT IDENT MEMORY" or "IDENT MEMORY" mode, as explained below. Two columns 86 and 88, respectively labeled "DEVICE" and "MODE" include labels that are selectively energized to identify the data device connected to ECOM 12 and the mode of operation. For example, under column 86, "VOICE," "FAX," or "DATA" are energized to indicate the corresponding device selected as a source of data that is encrypted, or to receive the data decrypted by ECOM 12. Under column 88, the mode options include "NON SEC," indicating that the user has selected operation in a non-secure mode, "PUB NET," indicating that the public network table of KEK encryption keys is being used to encrypt the portions of the DEK being interchanged between ECOMs 12 during their initial link up, and "PVT NET," indicating that the private table of KEKs is being used.

Six controls (seven buttons) are disposed below LCD screen 80 and comprise a DEVICE button 92, a MODE button 94 that has double function capability, an IDENT control 96 that has double function capability and is divided into a permanent memory (PM) button 96a and a temporary memory (TM) button 96b, a DELETE button 98 that also has double function capability, a CLEAR button 100, and a STORE button 102. DEVICE button 92 selects the device that will provide the data for encryption, or will receive the decrypted data (voice, fax, or data). MODE button 94 selects between secure and non-secure operation and also selects either the public or private table of KEKs that is to be used. IDENT control 96 controls all identification number functions (described below). DELETE button 98 deletes items that are stored in the electronic memory of an ECOM 12. CLEAR button 100 clears items on LCD screen 80 that are displayed by digits 82, while STORE button 102 causes data entered and displayed by digits 82 to be stored in memory.

Figure 4:
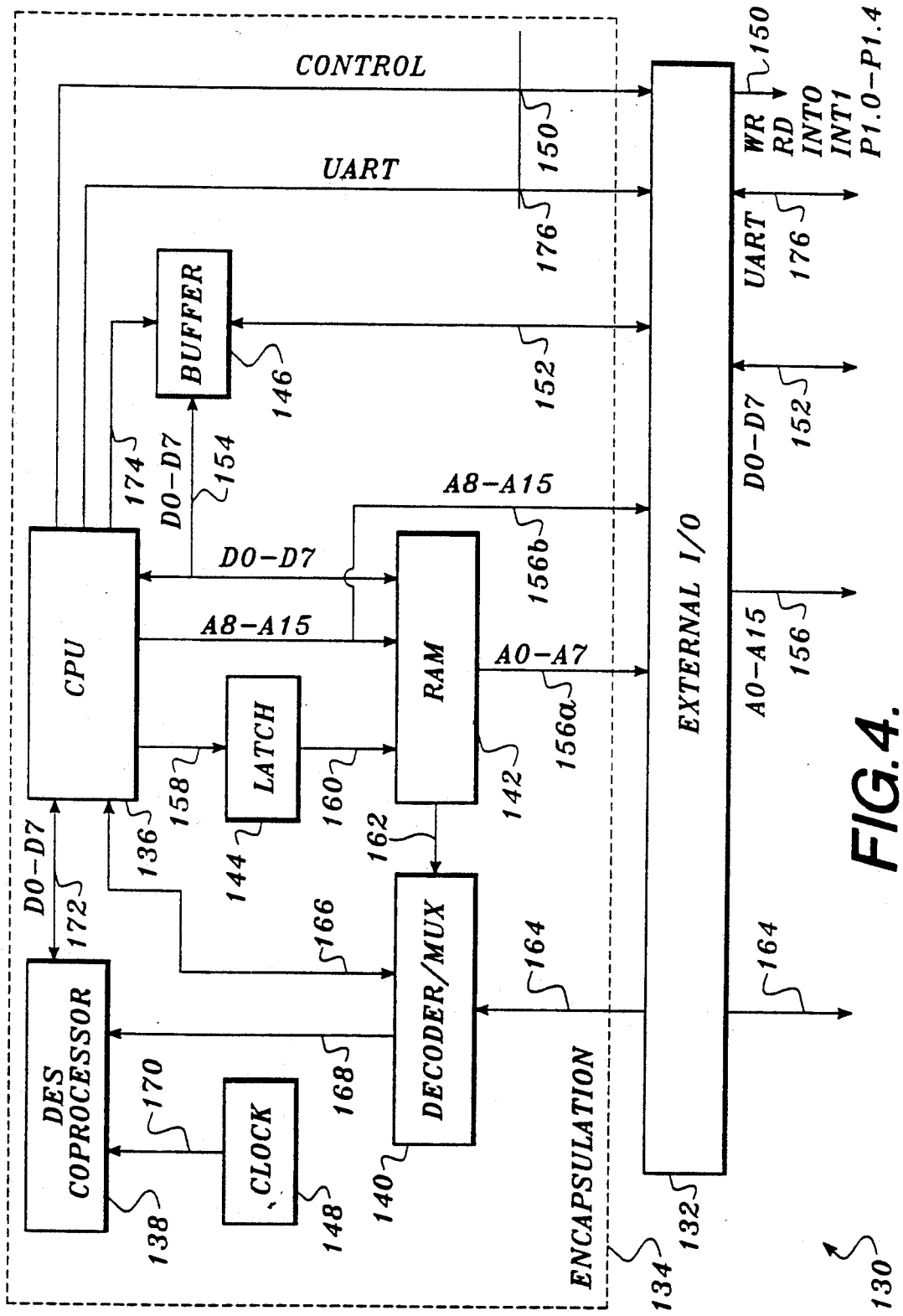
FIG. 4 is a schematic block diagram of one of the encryption/decryption units (EDUs) shown in FIG. 2.

A block diagram of EDU 30 is shown in FIG. 4; the EDU in each ECOM 12 is exactly the same, except for having a different EDU identification number stored within it. EDU 30 includes a potted module 130 and an external input/output (I/O) bus 132 for interconnection to the data device (or to any other components). Module 130, which comprises virtually the entire EDU, is encapsulated within a radio opaque and light opaque potting compound 134 to prevent discovery of the internal circuitry and to prevent forced electromagnetic or visual tapping, monitoring, or other forms of penetration that might be attempted to learn or modify encryption keys, program code, and other data stored therein. Of greatest sensitivity and importance in maintaining the security of communications between EDUs comprising the public and private networks are the KEKs that are stored within each EDU in an encrypted format using a key unique to the EDU. This key is assigned when the EDU is initialized or loaded with the KEKs. The KEKs are used for encrypting portions of the session encryption key that are exchanged between two ECOMs and subsequently logically combined at each EDU to produce a complete or final session encryption key that is used for encryption of data exchanged over non-secure line 18. It is absolutely imperative that these KEKs not become publicly known to avoid breaching secure communications between the EDUs.

In the preferred form of module 130, as noted above, two sets or tables of KEKs are stored in a random access memory (RAM) 142. One table is referred to as a public table, since each EDU 30 manufactured will include the same table. The other table is referred to as a "private" table of KEKs, because it optionally may be randomly generated by a user for distribution to and storage in only those EDUs of ECOMs 12 comprising private network 16. The significance of the KEKs will be apparent from the description that follows. Any attempt to expose the internal circuitry of module 130 by use of a chemical, solvent, or mechanical means in order to access RAM 142 electronically or physically so as to access these data will cause loss of the KEKs that are stored therein. RAM 142 preferably comprises a Dallas Semiconductor TM type DS 1213D smart socket in which is installed a memory, integrated circuit comprising 128K×8 bits of storage, i.e., yielding 1,048,576 bits of non-volatile static RAM organized as 131,072 words by 8 bits. This memory integrated circuit is a dual in-line package (DIP) package configuration of generally conventional design, but the smart socket contains an internal battery supply (not separately shown) sufficient to maintain data integrity in the absence of externally applied power for a period in excess of 10 years. Dallas Semiconductor also supplies an integrated circuit non-volatile memory device that includes an internal battery supply, and this type of device can be used in place of the smart socket and more conventional memory device combination. In the event a chemical solution is used to dissolve potting compound 34 in an attempt to discover the KEKs stored in RAM 142, the material comprising RAM 142 (smart socket or memory device that includes the internal battery supply) will also be dissolved, thereby disconnecting the internal battery supply and erasing the KEKs stored therein.

Operation of module 130 to establish and conduct secure communications is controlled by a CPU 136. In the preferred embodiment, a Dallas Semiconductor TM type DS 5000 microchip integrated circuit is used for CPU 136. The DS 5000 integrated circuit includes 32K of non-volatile embedded RAM (not separately shown) and all information and programming stored therein are preserved in the absence of an externally applied voltage for up to 10 years. In addition, the internal data registers and key configuration registers of the DS 5000 integrated circuit are non-volatile. Data stored within the embedded RAM that comprise program steps carried out by CPU 136 in establishing secure communications can be modified after encapsulation of module 130 has been accomplished with potting material 134 through UART 52, which is connected to CPU 136 through external I/O bus 132 by lines 176. In addition, control lines 150 connect CPU 36 to external I/O bus 132 and convey write, read, interrupt, and signals for ports 0–5 (P1.0–P1.5) of the CPU (only five of which are used by ECOM 12—P1.0–P1.4).

Data lines (D0–D7) 154 interconnect CPU 136 with RAM 142 and with a buffer 146. Buffer 146 comprises an SN 74HCT245N octal bus transceiver with a three-state output that is used to block external access to internal data transfers occurring within module 30, thereby preventing an external device from accessing KEKs stored in RAM 142 and other data transferred between components of the module. Buffer 146 is enabled via control signals supplied over a line 174 by CPU 136 when it is appropriate to allow bi-directional data transfer to and from external I/O bus 132 through lines 152, and therefore to and from an external device connected to ECOM 12, such as PC 26.

CPU 136 selects a specific storage location for a KEK within RAM 142 by setting 16 address bits that define the starting point of the KEK. Lines 158 connect CPU 136 to a latch 144, and lines 160 connect latch 144 to RAM 142. To minimize the total number of pins required on CPU 136, the first eight address bits (A0-A7) and eight bits of data (D0-D7) use the same pins on CPU 136. These address bits and data are alternately passed between CPU 136, latch 144, and RAM 142 over lines 158 and 160, respectively. The eight most significant bits of the address are conveyed on lines 156b directly from CPU 136 to RAM 142 and to external I/O bus 132. The least significant eight address bits (A0-A7) are carried on lines 156a. In the preferred embodiment, the 16 address bits are available on lines 156 at external I/O bus 132 to address the embedded RAM in CPU 136 when it is initially loaded or subsequently modified.

Although CPU 136 controls the operation of module 130, the actual encryption and decryption of data is implemented by a data encryption standard (DES) coprocessor 138. DES coprocessor 138 is designed to encrypt and decrypt 64-bit blocks of data using the algorithm specified in the Federal Information Processing Data Encryption Standard (No. 46). A data transfer rate of 807 kilobytes per second is implemented by DES coprocessor 138 under the control of a 10 MHz clock circuit 148, to which the DES coprocessor is connected through lines 170. Data are transferred between CPU 136 and DES coprocessor 138 over lines 172. In the preferred embodiment, a Western Digital TM type DES WD20C03A integrated circuit is used for DES coprocessor 138; similar devices are available from other suppliers.

A decoder/multiplexer (MUX 140) is connected through lines 168 to DES coprocessor 138 and through lines 166 to CPU 136. Decoder/MUX 140 is a three-line to eight-line circuit that decodes one of eight lines, dependent upon three binary select inputs and three enable inputs. Lines 166 carry the three binary select signals and the output signal from decoder/MUX 140 and line 168 carries selectable input 7. In addition, lines 162 carry selectable inputs 5 and 6 from RAM 142, while lines 164, which extend between decoder/MUX 140 and external I/O bus 132, convet selectable inputs 0-4.

The embedded non-volatile RAM in CPU 136 is loaded with the appropriate program steps for controlling the operation of EDU 30 at the time module 130 is manufactured. In addition, RAM 142 is loaded with a set of 65,535 public KEKs that are randomly generated from over 72 quadrillion possibilities. Each EDU that is thus produced stores the same table of 65,535 randomly generated public encryption keys. Any EDU can establish secure encrypted communications with any other EDU using the public KEKs. Also stored in RAM 142 is a user-generated table of over 65,535 randomly generated private encryption keys. These private KEKs are used for initiating secure communications with another EDU in private network 16 that has the same table of private KEKs stored within its RAM 142.

Figure 5:
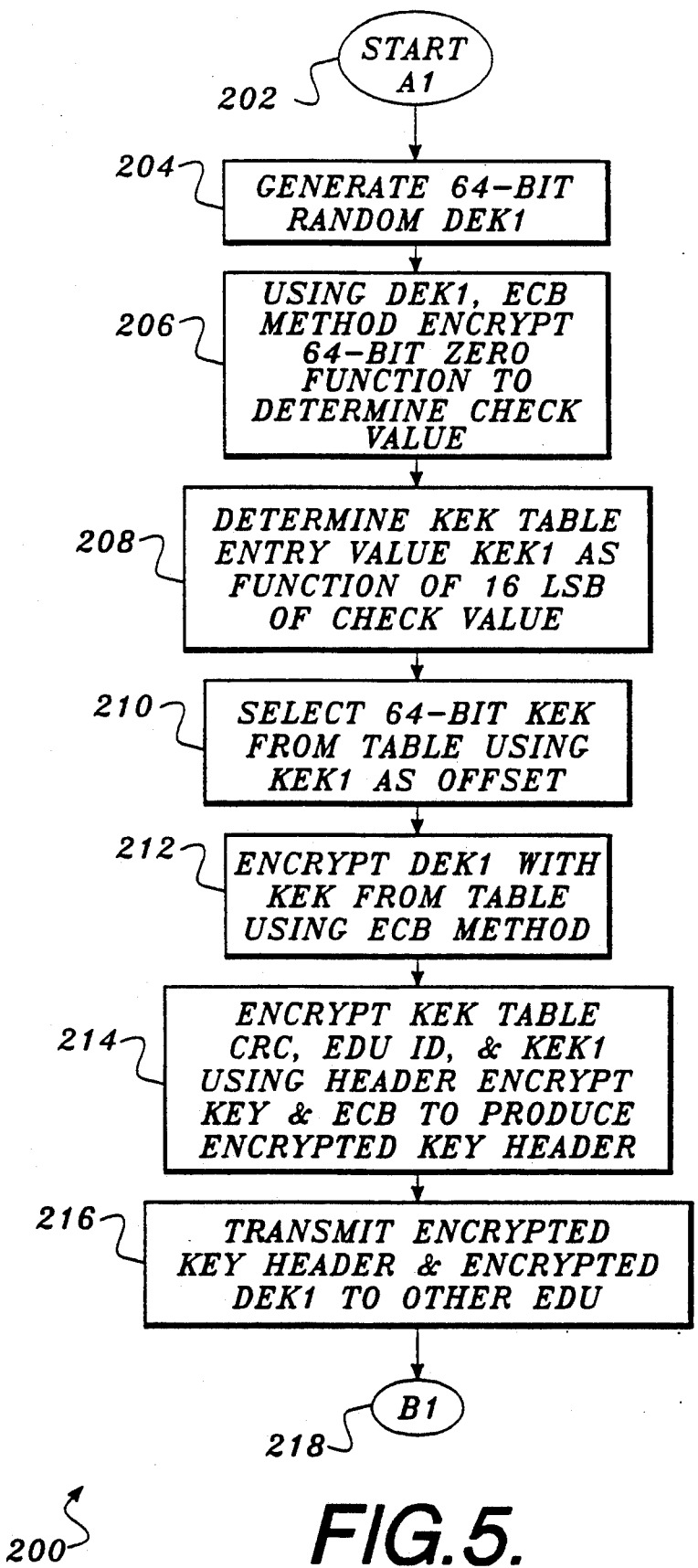
FIG. 5 is a flow chart illustrating the logical steps implemented in the ECOM at one station by the EDU in selecting and encrypting a first portion of a session encryption key for transmittal to another ECOM at a different station.
Figure 6:
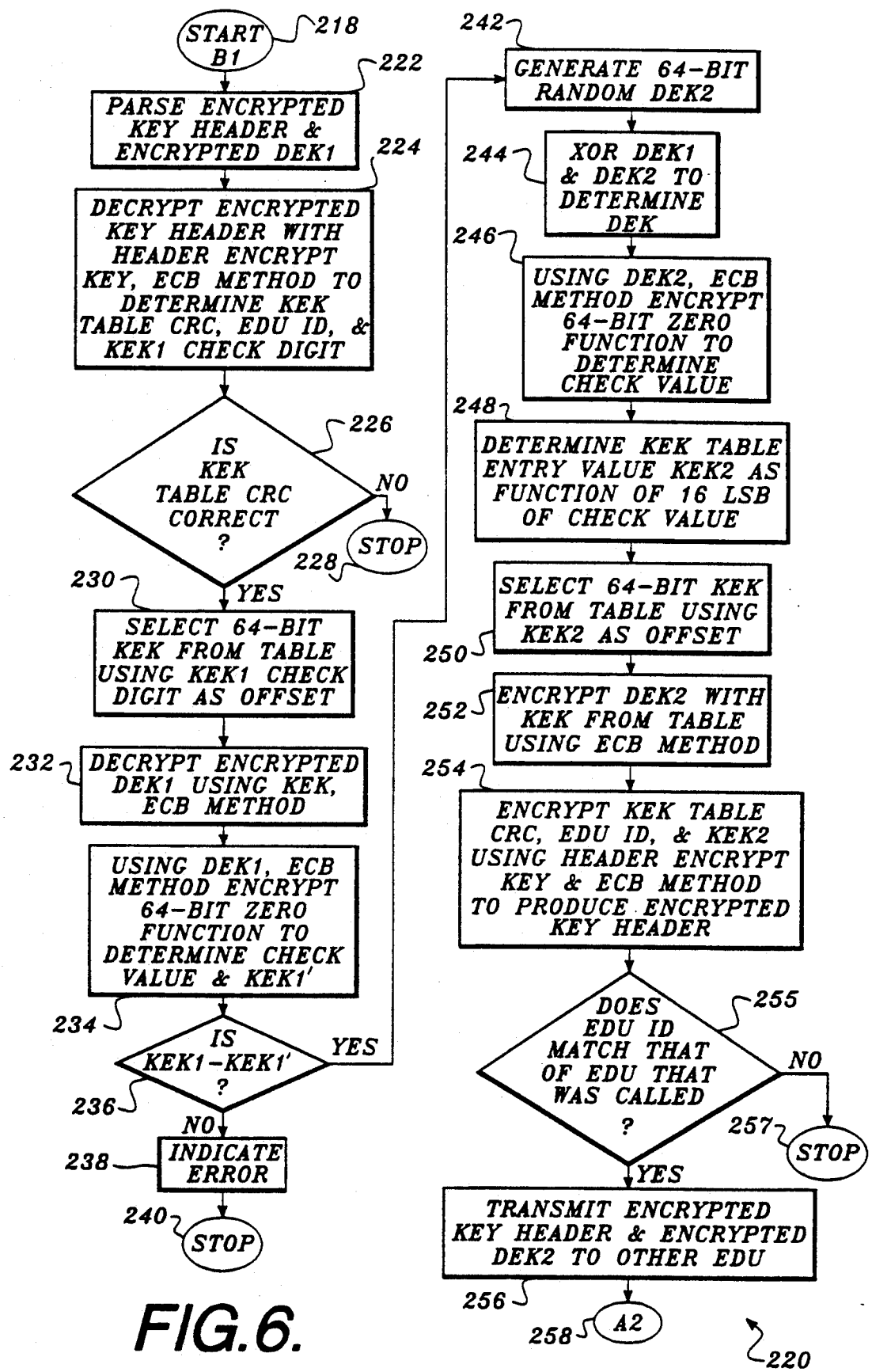
FIG. 6 is a flow chart illustrating the logical steps implemented by the EDU at the other station in decrypting the first portion of the session encryption key, and in selecting and encrypting a second portion of the session encryption key for transmittal to the one station.
Figure 7:
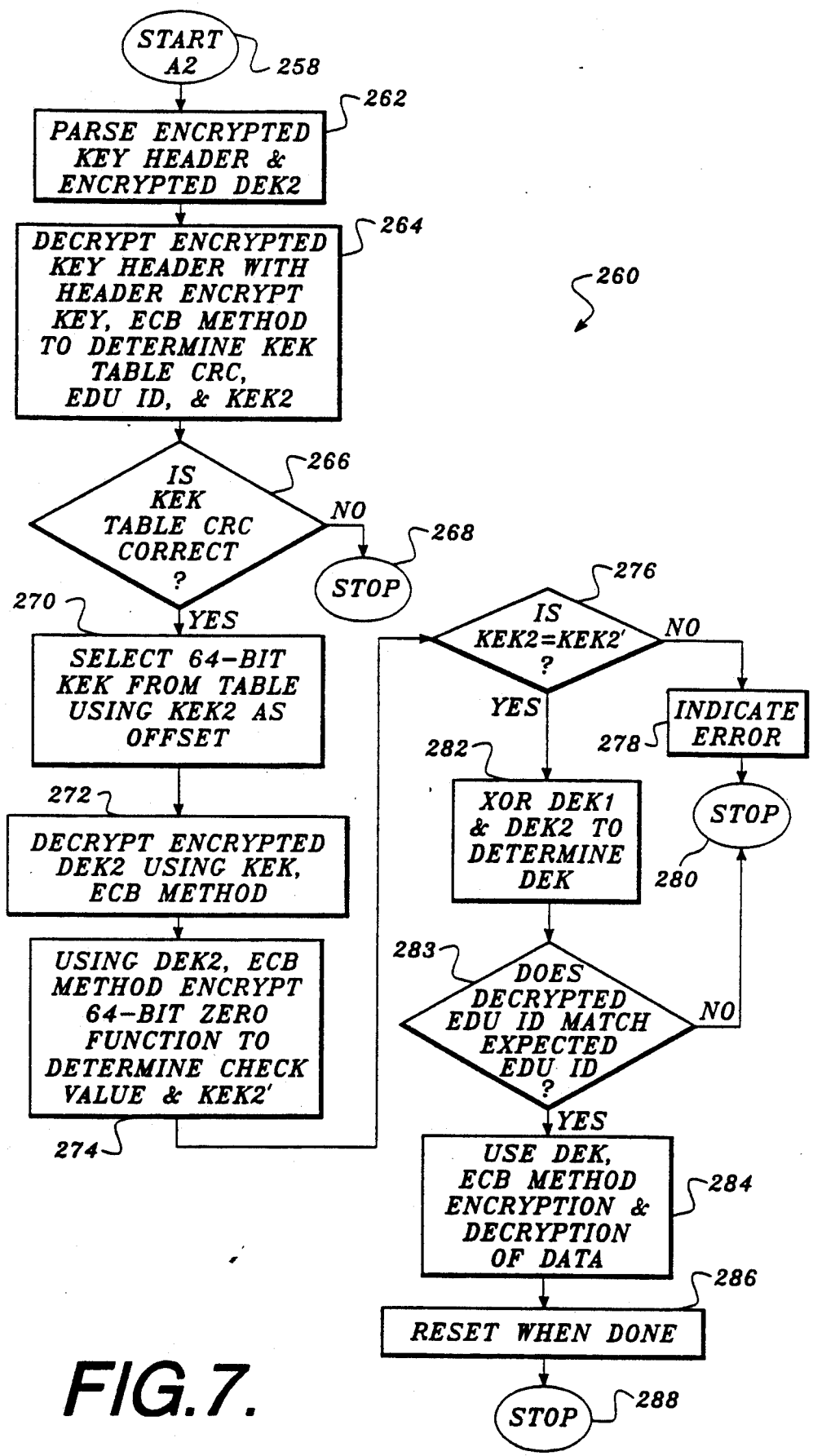
FIG. 7 is a flow chart illustrating the logical steps implemented by the EDU at the receiving ECOM, to decrypt the second portion of the session encryption key.

The steps involved in establishing secure communications between two ECOMs are shown in FIGS. 5, 6, and 7. The initial handshaking communications to establish a telephone connection are not shown. The handshaking communication begins, for example, when an operator at ECOM 12a dials a telephone number of an intended recipient ECOM, for example, ECOM 12b that includes a similar EDU. ECOM 12b answers with the assumption that it is receiving a call from another ECOM and transmits a 4-digit dial tone modulated frequency (DTMF) number, the first two digits of which identify the transmission as being sent by an ECOM and the second two digits identifying the mode in which it presently is operating. Upon receiving this communication, EDU 30 in ECOM 12a sends a 4-digit DTMF number back to ECOM 12b, the last two digits of which command ECOM 12b to operate in a particular mode. The mode identifies the type of communication which is desired, i.e., secure or non-secure, type of device that will source the data to be encrypted, and the table of KEKs (public or private) that will be used. Various other handshaking paradigms can be used in the alternative, and thus, this phase of the communications is not particularly relevant to the procedure for establishing secure communications between the two ECOMs.

In FIG. 5, a flow chart 200 identifies the steps next taken by the EDU at ECOM 12b, acting as the intended recipient, to establish secure communications. It will be apparent the steps in flow chart 200 could also be carried out by EDU 30 at ECOM 12a; however, the choice was made in the preferred embodiment to have the receiving ECOM start the process of determining a session data encryption key, thereby avoiding the possibility that a third party, having access to another ECOM and posing as a different party, might tap into the unsecured line to initiate the secure communications. The method begins with a start block 202. In a block 204, the EDU at ECOM 12b generates a 64-bit random data encryption key 1 (DEK1), which is one of over 72 quadrillion possible data encryption keys (i.e., all possible combinations of 56 bits).

The DEK1 is the first portion of a session data encryption key or DEK that will be subsequently used for transmitting encrypted data between the two ECOMs. In a block 206, the EDU at ECOM 12b provides the DEK1 for use as the encryption key in implementing the DEA to encrypt one block of data. The use of the DEA to encrypt a single block of data is referred to as an electronic code book (ECB) operation or method and is carried out by DES coprocessor 138 under the control of CPU 136. The ECB method employs the key (DEK1) to encrypt a 64-bit zero function, i.e., a function comprising 64 logical zeros; the result is used to determine a check value that defines an entry point into either the public or private table of KEKs, and thus the KEK that will be used to encrypt DEK1.

In a block 208, a KEK table entry value KEK1 comprising the 16 least significant bits (LSBs) of the 64-bit check value from block 206 is determined. The EDU uses the public or private table for KEKs, as specified by EDU 30 at ECOM 12a in its initial clear transmission. The public table and private table of KEKs each represent a linear array of data that are accessed in groups of four 16-bit words, i.e., 64-bits at a time, to define the KEK that will be used. The 16 LSBs of the check value thus determine the starting point or table entry value in the selected table of the 64 bits used as a KEK, as indicated in a block 210. Using the 64-bit KEK selected from the table as the encryption key for the ECB method, the EDU encrypts the value DEK1 in a block 212. A cyclic redundancy check (CRC) value for the KEK table that was selected is then determined in the conventional manner.

In a block 214, the EDU encrypts the KEK table CRC, its own EDU ID number (which is stored in within module 130 and is not user modifiable), and the KEK1 entry value; it uses a predefined header encryption key and the ECB method to produce an encrypted key header. The header encryption key is stored in the embedded RAM within CPU 136 at the time the CPU is initialized and loaded with programming and is the same for all EDUs. In a block 216, the EDU transmits the encrypted key header, followed by the encrypted DEK1 to EDU 30 in ECOM 12a, at the station which initiated the communication. Although both parts of this transmission are encrypted, they are encrypted at different levels of security, since the encrypted key header is always sent encrypted with the same predefined (although inaccessible) key and the encrypted DEK1 uses a different key with virtually every communication session between two ECOMs. The method for establishing secure communications continues in the EDU at ECOM 12a, at a block B1 218.

In FIG. 6, a flow chart 220 shows the steps carried out by EDU 30 (the EDU that initiated the communication at ECOM 12a). Flow chart 220 begins at block B1 218 and proceeds to a block 222 wherein the encrypted key header and encrypted DEK1 received from the EDU at ECOM 12b are parsed. In a block 224, the encrypted key header is decrypted using the predefined header encryption key with the ECB method, enabling the EDU to determine the KEK TABLE CRC, the encoded EDU ID number of the EDU that transmitted the encrypted header, and KEK1.

A decision block 226 causes the CPU to determine if the KEK table CRC is correct, i.e., does the CRC for the selected KEK table match that received from ECOM 12b; the CRC would not match the expected value if the two ECOMs were using two different private tables or if a corrupt public table were being used by ECOM 12b. If the CRC is not correct, the communication link up is stopped immediately as indicated by a block 228. Otherwise, the logic proceeds to a block 230. In block 230, EDU 30 at ECOM 12a determines the 64-bit KEK that was previously selected from the public or private table by the EDU at ECOM 12b, using the KEK1 value that it just received as an offset to enter the table. The 64-bit KEK thus selected from the appropriate table of KEKs is then used with the ECB method to decrypt the value DEK1, as shown in a block 232.

In a block 234, a validity check is made to ensure that the decryption process was carried out correctly and that the encrypted data were not affected by noise or other problems during transmission. The validity check is carried out by using the decrypted DEK1 value and the ECB method to encrypt the 64-bit zero function. The result provides a check value, the 16 LSBs of which represent a value KEK1'. The accuracy of the encryption/decryption process and transmission is confirmed in a decision block 236 if the EDU determines that KEK 1 equals KEK 1'. If not, a block 238 provides for indicating that an error has occurred in establishing secure communications, which leads to a stop block 240.

On the other hand, assuming that KEK 1 equals KEK 1', a block 242 directs the EDU to generate a 64-bit random value, DEK2, which is the second portion of the session data encryption key that will be used to encrypt data transmissions between the two EDUs. In a block 244, EDU 30 at ECOM 12a performs a logical XOR to combine the first portion of the session key, DEK1, and the second portion, DEK2, to determine the final session DEK. The DEK will subsequently be used for encrypting and decrypting all data transmitted between ECOM 12a and ECOM 12b during the current session, after initiation of secure communications is completed.

In a block 246, DEK2 is used with the ECB method to encrypt the 64-bit zero function in order to determine a second check value. Using the 16 LSBs of the check value in a block 248, the EDU determines a table entry value KEK2. By entering the specified public or private table at the address offset determined by KEK2, four consecutive 16-bit words comprising a 64-bit KEK2 are determined in a block 250. The EDU uses the value of KEK from the table and the ECB method to encrypt DEK2 in a block 252.

With the predefined header encryption key that is commonly stored in all EDUs, the EDU encrypts the KEK table CRC, its own EDU ID, and the table entry value KEK2, producing an encrypted key header in a block 254. The encrypted key header just produced and the encrypted DEK2 will be transmitted to ECOM 12b only if the next test is passed in a decision block 255.

Decision block 255 now determines whether the EDU ID that was decrypted from the header received from ECOM 12b in block 224 matches that of the EDU that was initially called, i.e., confirms that the intended recipient has responded. This determination checks that the decrypted EDU ID is one of up to 100 EDU IDs stored in the "permanent memory" of ECOM 12a or that it matches a specific EDU ID entered in the "temporary memory" of ECOM 12a before the operator at that station initiated the call to ECOM 12b. Since the encryption of the EDU ID to produce the encrypted key header is carried out automatically by the EDU at ECOM 12b in block 224 and can not be modified or affected by external signals, it is virtually impossible for a third party to use another EDU to break into a communications link up and take part in establishing secure communications, because the encrypted EDU ID that is returned to the ECOM that initiated the communication would then not match an expected EDU ID. A negative response to decision block 226 thus causes the process for establishing secure communications to be halted at a stop block 257. However, assuming that the decrypted EDU ID matches that of an intended recipient, the process continues. A block 256 provides for transmitting both the encrypted key header and encrypted DEK2 to the other EDU at ECOM 12b, which is the intended recipient for subsequent encrypted communication. Thereafter, the logic proceeds to a block A2 258 in FIG. 7.

FIG. 7 illustrates a flow chart 260 defining the steps next implemented by the EDU in ECOM 12b. Following block 258, a block 262 provides for parsing the encrypted key header and encrypted DEK2. The encrypted key header is then decrypted in a block 264 using the ECB method in connection with the predefined header encryption key, enabling the EDU at ECOM 12b to determine the KEK table CRC, the EDU ID of the transmitting ECOM 12a, and the KEK2 table entry value. In a decision block 266, the EDU at ECOM 12b determines if the KEK table CRC is correct, again confirming that the same public or private table is being used by the two ECOMs establishing secure communications. If a negative response results, a block 268 immediately stops the communication link up. However, assuming that the decrypted KEK table CRC matches the expected value, a block 270 provides for selecting a 64-bit KEK from the designated table of KEKs using the entry value KEK2 as an offset.

In a block 272, the EDU uses the selected KEK value in connection with the ECB method to decrypt the encrypted DEK2. It then performs a validity check in a block 274 by using the DEK2 value in connection with the ECB method to encrypt the 64-bit zero function, thereby determining a check value and a table entry value KEK 2' that is based upon the 16 LSBs of the check value. A decision block 276 causes CPU 136 to determine if the decrypted KEK2 equals KEK2' that was just determined in block 274. If not, a block 278 provides for indicating that an error has occurred, leading to a stop block 280.

However, assuming that the validity check has a positive response, in a block 282, the EDU logically XORs DEK1 and DEK2 to determine the value of DEK for this session. At this point, both the receiving and transmitting EDUs have established the current session data encryption key DEK. Before the communication session can proceed, one final check is made in a decision block 283.

Decision block 283 determines if the EDU ID sent by EDU 30 at ECOM 12a in the key header that was decrypted in block 264 by ECOM 12b matches an expected EDU ID, e.g., one of the up to 100 EDU IDs stored in permanent memory by ECOM 12b. If not, block 280 stops the process of establishing secure communications between the two ECOMs. Decision block 283 thus determines if a third EDU has been used to intercept communications between ECOMs 12a and 12b and is trying to act in place of ECOM 12a; if not, the communication of encrypted data by ECOM 12a to ECOM 12b proceeds at a block 284.

The session DEK is used in a block 284 by EDU 30 at ECOM 12a to encrypt data (such as voice, facsimile, or computer data) for transmission to the EDU at ECOM 12b, which decrypts it using the same DEK and then supplies it to the appropriate corresponding external device, i.e., telephone 20, fascsimile machine 22, PC modem 24, or PC 26. When the EDU at ECOM 12b determines that the last of the data has been decrypted, a block 286 resets both EDUs to await the next communication. Thereafter, a stop block 288 terminates further communication between the two ECOMs until another session is initiated.

During the process of establishing secure communications, neither of the EDUs linking ECOMs 12 together transmits DEK1 or DEK2 in the clear. Either the public or private table of KEKs is used for encrypting the first and second portions of the current session DEK. Consequently, only another EDU provided with the same control program and the same table of KEKs that was selected (having the same CRC) is able to decrypt either the encrypted first or second portions of the DEK. Furthermore, since the software program controlling the operation of the ECOMs 12 requires that the EDU ID number of the ECOM be encrypted as part of the key header information that is exchanged, a third EDU cannot be used to surreptitiously substitute for the intended recipient ECOM or transmitting ECOM during the establishment of the secure communication link. Consequently, only the two EDUs at the receiving and transmitting ECOMs comprising a link are able to establish a session DEK that will be used during the secure communications.

In addition, only an EDU that is using the same session DEK used to encrypt data can decrypt the data. Although any EDU can establish secure communications with any other EDU using the public table of KEKs, only EDUs sharing the same private table of KEKs (having the same CRC value) can establish a session DEK to communicate with each other if the portions of the session DEK are encrypted with the private table KEKs. As a result, a corporation that generates its own table of private KEKs can ensure that secure communications are initiated only with other ECOMs comprising its private network 16 that include the same table of private KEKs. This feature provides an additional level of security to those ECOM 12 comprising a private network.

While the DES algorithm is used in the preferred form of the present invention, it will be appreciated that other encryption algorithms that use an encryption key can also be employed. Several additional changes can be made in the above described procedure for establishing secure communications that do not affect its efficacy nor reduce the security of the link thus developed. For example, when determining a check value, a predefined function other than the zero function can be used. These and other modifications to the present invention will be apparent to those of ordinary skill in the art.

Operation of the ECOM

As explained above, ECOM 12 includes EDU 30 having a predetermined identification number that uniquely identifies that EDU, and thus the ECOM in which the EDU is installed. Because of this EDU ID checking protocol involved in establishing secure communications, a misdialed telephone number to a different ECOM 12 than was intended cannot result in a miscommunication of encrypted data, and it is virtually impossible for another ECOM to be used to intercept communications by posing as the intended recipient during the process of establishing secure communications. However, if the user has no particular concern about communications being misdirected to the improper ECOM or about another ECOM unit being used to tap into the line to subvert secure communications, it is possible for the ECOM that initiates the transmission to operate at a level 1 security mode that eliminates checking the EDU IDs of each of the ECOMs involved in a communication link.

The ECOM acting as the initial transmitter for establishing a secure communication link normally determines the type of device and mode of operation, including non-secure or secure, and specifies whether the public network KEK table or private network KEK table will be used. The receiving ECOM responds to the command choice of device and mode of operation unless it has been locked to prevent operation with other than a preselected device or mode of operation.

At the ECOM that initiates the transmission, a user selects the device that will serve as a source of the data for encryption by tapping DEVICE button 92, which successively causes VOICE, FAX, or DATA to be displayed on LCD screen 80, until the desired device is indicated. To lock ECOM 12 so that only that selected device is available for future communication links (until unlocked), the user can press STORE button 102 and hold it while tapping the DEVICE button, causing the selected device to flash, indicating that it is locked. In order to unlock the selection, a user holds the DELETE button while tapping a DEVICE button, causing the selected device that is indicated to remain steadily lighted.

To activate a security master lock for DEVICE, MODE, or IDENT memory selections, a user presses the STORE and DELETE buttons simultaneously until digits 82 display eight "Ls"; the user then uses the touch-tone keypad on the telephone or fax machine, or the PC keyboard to enter from four to eight digits of a security code and presses STORE button 102 until the display clears the security code. To unlock the master lock, the user presses the STORE and DELETE buttons simultaneously until the display again shows the eight Ls, and enters the digits of the previously selected security code that originally used to lock the selection. DELETE button 98 is then pressed until the display clears. If the display does not clear, it indicates that the incorrect security code has been entered.

To select the mode of operation, a user taps the MODE button, causing it to selectively energize in sequence, NON-SECURE, PUBLIC network, and PRIVATE network, until the desired mode is indicated on LCD screen 80. If NON-SECURE mode is selected, the PUBLIC network or PRIVATE network selection is not required; conversely, selection of PUBLIC network or PRIVATE network automatically selects the SECURE mode of operation.

To lock the mode selected, the user presses and holds the STORE button while tapping MODE button 94 until the desired mode is indicated. The selected mode then begins blinking or flashing to indicate that it is locked. To unlock the mode selection, the user presses and holds the DELETE button while tapping the MODE button, causing the displayed mode to remain steadily lighted.

Operation at security level 2 requires entry (or selection from a stored list) of an EDU ID for the intended recipient of the transmission. To enter a "temporary" ident number for the ECOM being called, i.e., an EDU ID number that will not be stored but will identify the specific intended recipient of a secure transmission, a user first selects the desired device and mode of operation and then taps TM button 96b, causing the LCD panel to indicate EDIT IDENT and to display eight dashes "--------" on digits 82. Using the tone keypad or PC keyboard, the user then enters an eight-digit ident number for the ECOM being called. Following the eighth digit, a telephone central office dial tone is automatically supplied and the temporary ident number entered is displayed on the LCD panel. The user then dials the telephone number for the intended recipient ECOM. During this link up, the two ECOMs establish secure communications by exchanging EDU IDs and their respective portions of the current session DEK in encoded format, as already explained. A received fax (transmitted in encrypted form) is provided with the word SECURE and the EDU ID of the transmitting ECOM. Once secure communications have been established, LCD screen 80 displays SECURE in region 90. In the event that there has been a failure to establish secure communications, LCD screen 80 displays NON-SECURE and indicates ERROR and IDENT.

Assuming that a temporary ident number for the intended recipient of secure communications has already been entered, the user first selects the desired device and mode, and then taps the TM button so that the display shows IDENT in region 84 and indicates the ident number in digits 82. If the displayed EDU ID number is that of the ECOM with which communication will be attempted, the user completes the call by dialing the appropriate phone number. If the user taps TM button 96b again, ECOM 12 enters an EDIT IDENT mode and indicates the mode in region 84, allowing the user to enter a new ident number with the touch-tone keypad or PC keyboard. Once the ident number has been edited, or if a previously entered number is selected, the telephone call is placed as described above.

EDU 30 within ECOM 12 is capable of storing up to 100 ID numbers for other commonly called ECOMs. To store an ID number in memory, a user presses and holds PM button 96b, causing LCD screen 80 to indicate IDENT and MEMORY on region 84. The user then releases the PM button and again presses and holds it until the display indicates EDIT IDENT MEMORY in region 84 and flashes a temporary ID number previously entered or eight hyphens in digits 82. If the temporary ID number is displayed, the user can enter it into memory by simply tapping STORE button 102. Assuming that no available memory locations remain unused, LCD screen 80 displays "L--00" on digits 82 for three seconds and the temporary ID number to be stored reappears, flashing to indicate that the number was not stored. The display shows the same indication if a digit is dialed when all 100 memory locations are full. To enter an ID number into memory when no memory locations remain unused, the user must first delete one of the existing 100 numbers already stored. To store additional eight digit ID numbers, assuming that 100 numbers have not yet been entered, the user enters a temporary ID number as explained above and taps STORE button 102. If memory locations for entry of new numbers are available, digits 82 display "L--55" (or some other two digit number instead of 55) indicating the number of memory locations available. After three seconds, the display shows eight hyphens, indicating that the number was stored.

To view and edit ID numbers that have been stored in permanent memory, a user presses and holds PM button 96a until IDENT MEMORY is displayed in region 84. The user then releases the PM button and presses it and holds it again until the display shows EDIT IDENT MEMORY in region 84 and flashes a previously entered temporary ID number, or eight hyphens if none was entered. Successively tapping PM or TM (Up or Down) buttons 96a or 96b causes the numbers stored in permanent memory to scroll in digits 82.

To delete an ID number from permanent memory, PM button 96a is pressed until region 84 indicates IDENT MEMORY; the PM button is then being released and either the PM or TM (Up or Down) buttons are pressed to scroll until the EDU ID displayed is the one to be deleted. At any time, STORE button 102 can be pressed to display the number of available memory locations remaining unused. Once the desired ident number to be deleted is displayed, the user taps DELETE button 98, causing the selected ID number to flash. DELETE button 98 is again tapped to delete the ID number from memory; digits 82 then display the number of available locations.

To use the permanent ID number when a temporary number was previously entered, the user selects the desired device and mode and presses PM button 96a until digits 82 display the temporary ID number and region 84 indicates IDENT MEMORY. The user then lifts the telephone hand set to complete the call. After ECOM 12 establishes link up with the ECOM being called and the two ECOMs have exchanged identification numbers, the ECOM serving as the initiator of the call verifies the ident number for the called ECOM by checking those numbers stored in permanent memory, including the displayed temporary number. Assuming that the EDU IDs received from the other ECOM matches either the temporarily displayed number OR one of the numbers in permanent memory, the two ECOMs display SECURE in region 90.

To use a permanently stored item number without previously entering a temporary number, a user selects a desired device and mode, and presses PM button 96 until digits 82 display eight hyphens and region 84 indicates IDENT MEMORY. The user then lifts the hand set and dials the desired telephone number of the intended recipient ECOM. The EDU ID for the intended recipient ECOM is verified by checking the ident numbers stored in permanent memory. Assuming that the ident number of the ECOM attempting to link with the ECOM that initiated the transmission is not found in memory, region 90 on LCD screen 80 indicates NON-SECURE, ERROR, and IDENT, accompanied with an audible beep to indicate that an error has occurred. The attempted link up is then terminated until the user takes further action. To exit permanent memory, the user taps PM button 96a.

During initial power up of ECOM 12, LCD screen 80 displays all enunciators, generally as shown in FIG. 3. LCD screen 80 then displays "DIAG" and runs through a series of three digit internal codes in digits 82, while it performs an internal diagnostic check. In the event that a problem occurs during link up between two ECOMs, ERROR is displayed, and digits 82 display a three-digit code indicating the cause of the problem, i.e., line trouble, memory failure, etc.

Although the table of public keys that is stored within EDU 30 in each ECOM 12 is previously generated and loaded at the factory during manufacture of the EDU, a user may optionally generate the private network table of KEKs with a utility program. The private table of KEKs is either uploaded to other ECOMs in the private network from the ECOM where generated, or stored on a floppy disk in an encrypted format. The floppy disk is then taken to each of the other ECOMs comprising the private network and uploaded to the internal memory of the ECOM through the device port of the ECOM that is connected to PC 26 in which the floppy is inserted. A security code is required for uploading and downloading the private table of KEKs in this manner to enable encryption and decryption of the private table of KEKs.

It is possible for the factory to upload modifications to software for storage in the embedded non-volatile RAM in the CPU 136 of each ECOM using a predefined password known only to the manufacturer. These revisions can be transferred in encrypted form from the factory over non-secure telephone line 18 or encrypted and transferred on a floppy disk. In this manner, any improvements or corrections for "bugs" found in the software are readily supplied to the ECOMs already in use.

A network of ECOMs 12 thus comprises a secure communications system that allows any user to selectively encrypt voice, facsimile, or data for transmission to another such device. Because of the method used to establish secure communications between two ECOMs by randomly generating portions of the DEK at each ECOM for the current session, the need for physically distributing and changing encryption keys is substantially eliminated. Accordingly, this invention represents both a cost effective and efficient solution to the problem of providing secure communications between each station in a network for the various types of communication devices typically found in an office.

While the present invention has been described with respect to a preferred embodiment and modifications thereto, it is not intended that the invention be in any way limited by this description. Instead that the scope of the invention should be determined entirely by reference to the claims that follow.

The embodiments of the invention in which an exclusive property or privilege is claimed are defined as follows:

1. An encrypted communications system, for use with at least one external device, comprising:
 (a) an encryption/decryption circuit, said encryption/decryption circuit comprising:
  (i) processor means for selectively encrypting and decrypting input data in accordance with predefined instructions using a session key that is determined by combining a first data encryption key that is automatically randomly selected by the processor means, with a second data encryption key that is received over a transmission link from a remote site; and
  (ii) non-volatile memory means for storing the predefined instructions;
 (b) a line modem, coupled to said encryption/decryption circuit and to the transmission link over which encrypted messages are transmitted and received by the line modem;
 (c) a device modem, coupled to the encryption/decryption circuit and adapted to receive a signal from an external device, said device modem including means for producing an input signal from the signal supplied by the external device, and means for converting a decrypted signal from the encryption/decryption circuit to an output signal that is in a format suitable for use by the external device, wherein said encryption/decryption circuit encrypts the input signal using the session key, producing an encrypted signal, transfers said encrypted signal to the line modem for transmission over the transmission link, and in addition, decrypts any encrypted signal received from the line modem that was supplied by an encryption station at another location over the transmission link to produce the decrypted signal, said encryption/decryption circuit then transferring the decrypted signal to the device modem for conversion to the output signal;
 (d) control means, coupled to the encryption/decryption circuit, for controlling a mode in which the encryption/decryption circuit operates; and
 (e) a display, coupled to the encryption/decryption circuit, on which is displayed an indication of the mode.

2. The encrypted communications system of claim 1, wherein the control means comprise a device selector switch for selecting the external device that provides the input signal to the device modem and receives the output signal from the device modem, from among a plurality of external devices that are couplable thereto, the plurality of external devices including data entry means for enabling a user to enter data utilized by the control means in establishing secure communications.

3. The encrypted communications system of claim 1, wherein the control means further include a mode switch that selects operation in one of a non-secure mode in which signals transmitted and received over the transmission link are not encrypted, and a secure mode in which said signals are encrypted.

4. The encrypted communications system of claim 1, wherein the control means further include a network switch that selects between a plurality of sets of key exchange keys stored in the non-volatile memory means, from which a specific key exchange key is selected for use by the processor means for initiating secure communications by encrypting part of the session key for transmittal to an encryption station at another location, at least one set of key exchange keys selectable with the network switch being associated with a private network, so that selection of the set of key exchange keys associated with the private network limits secure communications to that network.

5. The encrypted communications system of claim 1, further comprising a data port that is coupled to the encryption/decryption circuit, said data port being couplable to an external digital device to receive digital input data for encryption and to transfer digital output data that have been decrypted by the encryption/decryption circuit, bypassing the device modem.

6. The encrypted communications system of claim 1, wherein the processor means selectively generates the set of key exchange keys associated with the private network, encrypts said set of key exchange keys producing an encrypted set of key exchange keys, and transfers the encrypted set of key exchange keys through the data port to an external digital device for storage.

7. The encrypted communications system of claim 6, wherein an encrypted set of key exchange keys associated with the private network are input through the data port from an external digital device, said encryption/decryption circuit decrypting the encrypted set of key exchange keys and storing said set in the non-volatile memory means.

8. The encrypted communications system of claim 1, wherein the non-volatile memory means store an identification code that uniquely identifies an encryption/decryption station, said processor means halting secure communications if directed to an encryption/decryption station having an identification code different than that stored in the non-volatile memory means.

9. The encrypted communications system of claim 8, further comprising means for storing a plurality of identification codes of other encryption/decryption stations to facilitate initiating secure communications with each such encryption/decryption station.

10. The encrypted communications system of claim 9, wherein the display selectively shows an identification code of another encryption/decryption station with which secure communications are to be initiated from among those identification codes that are stored, and wherein the control means select said identification code.

11. The encrypted communications system of claim 1, wherein the device modem includes means for digitizing voice analog signals for encryption by the encryption/decryption circuit, and means for converting digitized signals comprising voice transmission decrypted by the encryption/decryption circuit back to analog voice signals.

12. The encrypted communications system of claim 1, wherein the processor means precludes acceptance and use of operating parameters entered on the control means unless a security code is input by a user.

13. An encrypted communication system for providing secure communications between a first station and a second station wherein each station includes at least one external device, each station comprising:
(a) an encapsulated encryption/decryption circuit that includes an input port and an output port, said encryption/decryption circuit selectively encrypting data provided to the input port using a session encryption key that is locally generated only in part, another part of said session encryption key being externally generated at the other station;
(b) a line modem, coupled to said encapsulated encryption/decryption circuit and to a transmission link that couples the first to the second station for conveying encrypted messages, said line modem transmitting and receiving the encrypted messages over the transmission link;
(c) a device modem, coupled to the encapsulated encryption/decryption circuit and adapted to selectively couple to an external device, including at least one such external device selected from a group consisting of a telephone, a facsimile machine, and a computer, said device modem digitizing an analog signal received from the external device, producing a corresponding digital signal that is applied to the input port of the encryption/decryption circuit, said device modem also receiving a digital signal from the output port of the encapsulated encryption/decryption circuit and converting said digital signal to a corresponding analog signal that is output to the external device; and
(d) a plurality of controls, coupled to the encapsulated encryption/decryption circuit, for selectively operating the encrypted communications system in one of a plurality of modes, including a secure communications mode and a non-secure communications mode.

14. The encrypted communications system of claim 13, wherein each station further includes display means for indicating the mode in which the encrypted communications system is operating.

15. The encrypted communications system of claim 13, wherein the encapsulated encryption/decryption circuit in each station includes memory means for storing a plurality of instructions controlling the encapsulated encryption/decryption circuit and for storing a plurality of key exchange keys used for encryption of parts of the session encryption key that are exchanged between the first and second stations.

16. The encrypted communications system of claim 15, wherein the memory means store a unique identification code for the station in which it is disposed that can not be altered by a user, said encapsulated encryption/decryption circuit halting communications between the first and second station if communications directed to one of the stations include an identification code for that station that differs from the identification code stored by the memory means in that station.

17. The encrypted communications system of claim 16, wherein the encapsulated encryption/decryption circuit includes means for storing a plurality of identification codes for other stations, said plurality of controls including means for selecting one of the plurality of identification codes of a station that is to be an intended recipient of an encrypted transmission for inclusion in an initial transmission to said station.

18. The encrypted communications system of claim 15, wherein each station further comprises a data port couplable to an external digital device to bi-directionally convey data in a digital format, said data port being coupled to the encapsulated encryption/decryption circuit to selectively transfer a set of key exchange keys generated and encrypted by the encapsulated encryption/decryption circuit to the external digital device, and to transfer a set of key exchange keys generated at a different station to the encapsulated encryption/decryption circuit from the external digital device for storage in the memory means, said set of key exchange keys being thus generated at one station and distributed to other stations comprising a limited network, a public set of key exchange keys being stored in the memory means of all stations, even those not in the limited network.

19. The encrypted communications system of claim 13, wherein the encapsulated encryption/decryption circuit comprises processor means for controlling the encapsulated encryption/decryption circuit.

20. The encrypted communications system of claim 19, wherein the device modem transmits touch-tone signals produced by a telephone to control the processor means.

* * * * *